Patented Dec. 27, 1949

2,492,929

UNITED STATES PATENT OFFICE 2,492,929

POLYMERIZATION OF VINYL ESTERS IN SOLUTION IN DIOXANE, TETRAHYDROFURAN, OR TETRAHYDROPYRAN

William Robert Cornthwaite, Wilmington, Del., assignor to E. I. du Pont de Nemours & Company, Wilmington, Del., a corporation of Delaware No Drawing. Application December 7, 1945, Serial No. 633,528

7 Claims. (Cl. 260—89.1)

This invention relates to the polymerization of vinyl esters and more particularly to a method whereby low-melting polymers can be obtained.

Polymers of vinyl esters of carboxylic acids are thermoplastic materials which can be softened or made plastic, and in some cases melted, by heating. Certain uses require lower viscosities (higher fluidity) at elevated temperatures than those encountered in polyvinyl esters commonly produced. For example, polyvinyl acetate is useful as a hot melt adhesive, and for this use, small lumps or particles of solid polymer having considerable fluidity at temperatures around 100° is desired. It is desirable to have small lumps of polymer in order to facilitate handling for transportation and final use. A material which softens above room temperature but which is very fluid at 90–110° is preferred. The present known methods for producing such a product involve either polymerization at low monomer concentrations in the presence of a low boiling solvent, such as methanol, or at higher temperatures under pressure or by polymerizing in a high boiling solvent such as toluene. Polymerization at low monomer concentrations requires excessive amounts of catalyst in order to obtain a satisfactory polymerization rate. The use of pressure involves special equipment and leads to a more complicated process. Also granular polymerization to yield very low molecular weight polyvinyl acetate has not been successful.

An object of this invention is to provide a means for polymerizing vinyl esters of carboxylic acids whereby low-viscosity products are obtained. A further object is to prepare a polyvinyl acetate which will liquefy and flow readily at temperatures of about 90–110°. Other objects will be hereinafter apparent.

I have found that vinyl esters of carboxylic acids can be polymerized under nonaqueous conditions in solution in certain saturated cyclic ethers to produce polymers that are lower in molecular weight than polyvinyl esters produced under similar conditions using other solvents such as alcohols. For example, I may obtain such low molecular weight polymers by polymerizing vinyl acetate dissolved in dioxane, tetrahydrofuran or tetrahydropyran. These low-molecular weight products have good fluidity at temperatures of 90–110° C. but are solids at room temperature.

The following examples will illustrate my method of preparing low molecular weight polymers using the cyclic ethers as solvents.

Example 1

200 parts by weight of vinyl acetate, 200 parts of dioxane and 1.5 part of benzoyl peroxide were placed in a reaction vessel, and the temperature of the solution was maintained to 68–73° C. for four hours, whereby 91% of the vinyl acetate was polymerized. The polymer was isolated by distilling off the dioxane and further drying the polymer in an oven at 110° C. An 86 g./l. benzene solution of the polymer had a viscosity of 2.0 cp. at 20° C. The polymer had a bright yellow color. It was a hard solid at room temperature and a mobile liquid at 90–100° C.

Example 2

200 parts by weight of vinyl acetate, 200 parts of tetrahydrofuran and 1.5 parts of benzoyl peroxide were treated as in Example 1. After four hours, 62% of vinyl acetate was polymerized and after seven hours 72%. A brown polymer was isolated by the method of Example 1. An 86 g./l. benzene solution of the polymer had a viscosity of 1.7 cp. at 20° C. The polymer was solid at room temperature and quite fluid at 90° C.

My invention can be utilized to polymerize the various vinyl esters of carboxylic acids, for example vinyl formate, vinyl acetate, vinyl propionate, vinyl stearate and homologues thereof. Any of the known peroxygen compounds which act as catalysts for polymerizing vinyl esters are suitable as catalyst in practicing my invention. For example, I may use as polymerization catalysts the various organic peroxides, such as benzoyl peroxide, acetyl peroxide and other acyl peroxides. The hydroperoxides derived from aliphatic alcohols also may be used. I may also utilize hydrogen peroxide and both organic and inorganic peracids and their salts, for example ammonium persulfate, peracetic acid and the like.

I prefer to utilize the above described cyclic ethers as the sole solvents for the polymerization reaction, and I may utilize one of these ethers or any mixture of them. If desired, the reaction mixture may be diluted by the addition of other solvents. It is essential, however, that a relatively large proportion of the cyclic ether be present in the reaction mixture and for each part by weight of vinyl ester initially present, I prefer to have present at least about 0.5 to 1 part by weight of the cyclic ether. Still larger amounts of the cyclic ether may be used as desired, with or without the addition of diluents, but generally there is no advantage in exceeding the aforesaid 1:1 ratio of cyclic ether to vinyl ester.

Various other modifications which can be made without departing from the present invention will be apparent to those skilled in the polymerization of vinyl esters. For example, various other polymerizable compounds can be simultaneously polymerized, i. e. copolymerized with the vinyl esters, preferably in low proportions such as 10% or less. Such copolymerizable materials include other vinyl compounds, such as the vinyl aryls, vinyl ethers and vinyl halides and also acrylic acid and its derivatives, such as acrylic acid, methacrylic acid and their esters, amides and nitriles and the like. In short, any material which can be polymerized in a nonaqueous medium with a peroxygen type polymerization catalyst can be copolymerized with vinyl esters in accordance with my invention.

The products of my invention are vinyl ester polymers characterized by low molecular weight and low viscosity. The molecular weight and viscosities of these products may be gauged by determination of the viscosity of a benzol solution one liter of which contains a weight of the polymer equal to one gram-mole of the corresponding monomeric ester, e. g. 86 grams per liter of polyvinyl acetate. For convenience, these solutions are herein designated as "mono-molar" solutions. The mono-molar benzol solutions of the vinyl ester polymers of my invention have viscosities not higher than 5 centipoises and usually as low as 1 to 2 centipoises, measured at 20° C. These polymers have good fluidity at temperatures of about 90° C. and higher and are hard solids at room temperature. They may be utilized as plastics, either alone or mixed with various plasticizers, fillers or other resinous materials in various proportions. They are particularly useful as hot-melt adhesives or as ingredients thereof.

I claim:

1. The process which comprises polymerizing alone a vinyl ester of a carboxylic acid in the homologous series which includes vinyl formate and vinyl acetate, while dissolved in a non-aqueous medium comprising a cyclic ether selected from the group consisting of dioxane, tetrahydrofuran and tetrahydropyran, in the initial proportion of approximately 0.5 to 1 part by weight of said ether to one part by weight of said ester, in the presence of a peroxygen compound as polymerization catalyst.

2. The process which comprises polymerizing alone vinyl acetate while dissolved in a non-aqueous medium comprising a cyclic ether selected from the group consisting of dioxane, tetrahydrofuran and tetrahydropyran, in the initial proportion of approximately 0.5 to 1 part by weight of said ether to one part by weight of vinyl acetate, in the presence of a peroxygen compound as polymerization catalyst.

3. The process which comprises polymerizing alone vinyl acetate under non-aqueous conditions, while dissolved in tetrahydrofuran, in the initial proportion of approximately 0.5 to 1 part by weight of tetrahydrofuran to one part by weight of vinyl acetate, in the presence of a peroxygen compound as polymerization catalyst.

4. The process which comprises polymerizing alone vinyl acetate under non-aqueous conditions, while dissolved in dioxane, in the initial proportion of approximately 0.5 to 1 part by weight of dioxane to one part by weight of vinyl acetate, in the presence of a peroxygen compound as polymerization catalyst.

5. The process which comprises polymerizing alone vinyl acetate under non-aqueous conditions while dissolved in tetrahydropyran, in the initial proportion of approximately 0.5 to 1 part by weight of tetrahydropyran to one part by weight of vinyl acetate, in the presence of a peroxygen compound as polymerization catalyst.

6. The process for polymerizing vinyl acetate alone under non-aqueous conditions, which comprises dissolving one part by weight of vinyl acetate in approximately 0.5 to 1 part by weight of tetrahydrofuran and heating the solution in the presence of an organic peroxide polymerization catalyst.

7. The process for polymerizing vinyl acetate alone under non-aqueous conditions, which comprises dissolving one part by weight of vinyl acetate in approximately 0.5 to 1 part by weight of tetrahydrofuran and heating the solution in the presence of benzoyl peroxide as polymerization catalyst.

WILLIAM ROBERT CORNTHWAITE.

REFERENCES CITED

The following references are of record in the file of this patent:

UNITED STATES PATENTS

| Number | Name | Date |
|---|---|---|
| 1,710,825 | Hermann | Apr. 30, 1929 |
| 1,984,678 | Hermann | Dec. 18, 1934 |
| 1,988,529 | Werntz | Jan. 22, 1935 |
| 2,007,557 | Blaikie | July 9, 1935 |
| 2,109,981 | Voss | Mar. 1, 1938 |
| 2,397,260 | Hanford et al. | Mar. 26, 1946 |